United States Patent
Wu (10) Patent No.: US 8,740,998 B2
(45) Date of Patent: Jun. 3, 2014

(54) METHOD FOR FORMING LOW-RESISTANCE ELECTRIC CONNECTION POINTS FOR A BATTERY CELL WITH TWO EXTERNAL NICKEL ELECTRODE TERMINALS

(75) Inventor: Donald P. H. Wu, Hsinchu County (TW)

(73) Assignee: Energy Control Limited, Tortola (VG)

( * ) Notice: Subject to any disclaimer, the term of this patent is extended or adjusted under 35 U.S.C. 154(b) by 0 days.

(21) Appl. No.: 13/533,455

(22) Filed: Jun. 26, 2012

(65) Prior Publication Data

US 2012/0266453 A1 Oct. 25, 2012

Related U.S. Application Data

(63) Continuation-in-part of application No. 12/510,996, filed on Jul. 28, 2009, now abandoned.

(51) Int. Cl.
*H01M 6/00* (2006.01)

(52) U.S. Cl.
USPC ........................................... 29/623.1; 429/121

(58) Field of Classification Search
USPC ................. 29/623.1; 429/121, 231.8, 7, 158; 415/208.1
See application file for complete search history.

(56) References Cited

U.S. PATENT DOCUMENTS

2004/0115519 A1* 6/2004 Lee .................................. 429/61
2009/0280406 A1* 11/2009 Kozuki .......................... 429/209

* cited by examiner

*Primary Examiner* — Mark F Huff
*Assistant Examiner* — Monique Wills
(74) *Attorney, Agent, or Firm* — Banger Shia (57) ABSTRACT

A method for forming low-resistance electric connection points for a battery cell with two external nickel electrode terminals, when the graphite alloy connecting member is brought into contact with the external nickel terminals of the battery cell, graphite will be separated out of the graphite alloy connecting member, and the nickel will be separated out of the external nickel terminals of the battery cell, and then the graphite and the nickel are dissolved into each other, so that the graphite alloy connecting member and the external nickel electrode terminals of the battery cell are melted and seamlessly connected. Hence, the resistance of the battery cell is reduced to the least, while the discharge and conductivity performance of the battery cell are improved.

3 Claims, 8 Drawing Sheets

METHOD FOR FORMING LOW-RESISTANCE ELECTRIC CONNECTION POINTS FOR A BATTERY CELL WITH TWO EXTERNAL NICKEL ELECTRODE TERMINALS

This application is a continuation of part of U.S. patent application Ser. No. 12/510,996, which claims the benefit of the earlier filing date of Jul. 28, 2009. Claims 1-3 of this application are new.

BACKGROUND OF THE INVENTION

1. Field of the Invention

The present invention relates to a battery cell, and particularly to a method for forming low-resistance electric connection points for a battery cell with two external nickel electrode terminals.

2. Description of the Prior Art

A battery pack usually consists of hundreds or even thousands of serially or parallel connected battery cells. The electric connection among the battery cells is achieved by welding metal plates to the electrode terminals of the battery cells, and then the metal plates electrically connect the battery cells together. Hence, the conductivity of the electrical welding points has great influence on the conductivity of the entire loop of the battery pack. However, the electrode terminals of the battery cells are very likely to be oxidized and covered with impurities since they are external terminals exposed to atmospheric environment containing moisture and impurities. The oxides and impurities on the electrical terminals will produce a contact resistance, which will have a direct influence on the conductivity, and deteriorate the discharge and conductivity performance of the battery pack.

Figure 1:
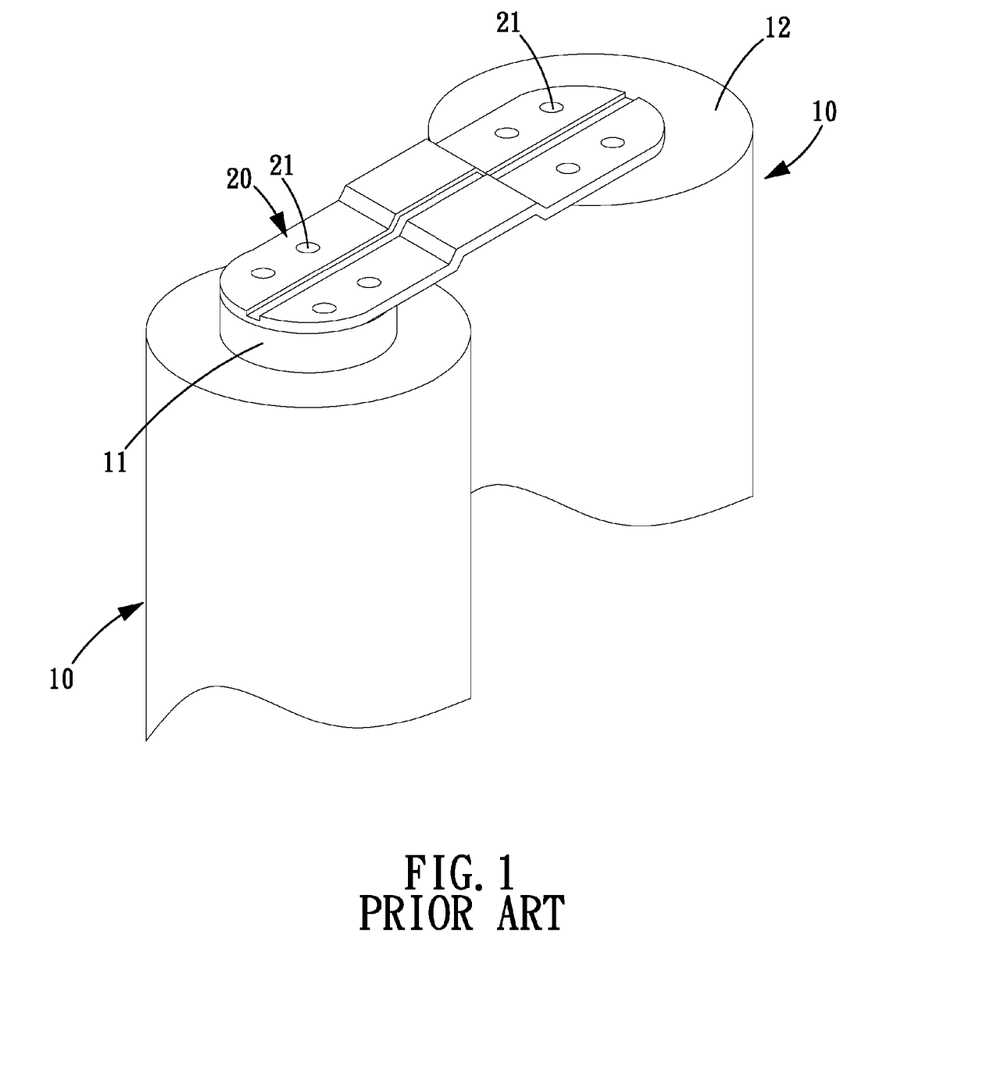
FIG. 1 shows that two conventional battery cells are connected in series by spot welding of a nickel plate.
Figure 2:
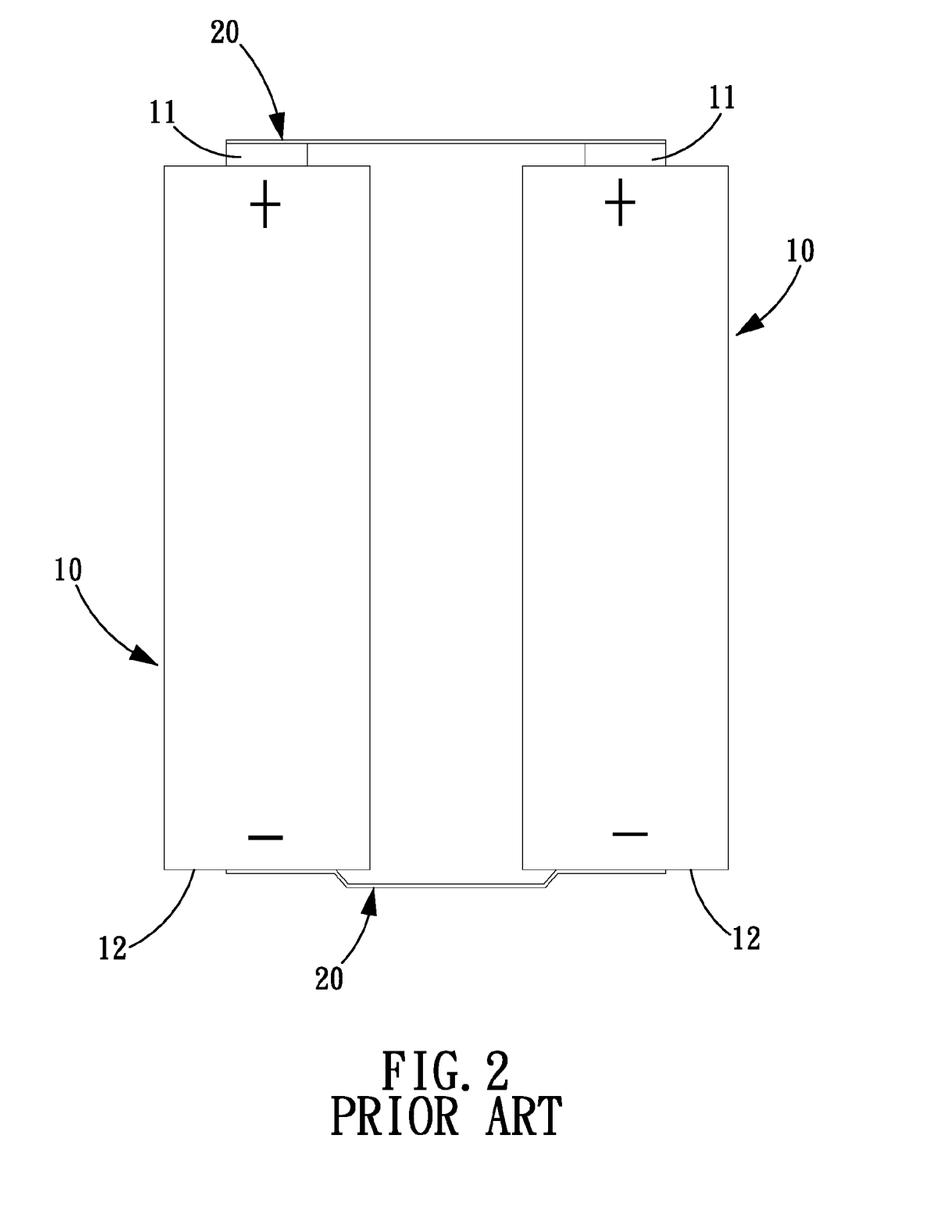
FIG. 2 shows that two conventional battery cells are connected in parallel by spot welding of a nickel plate.

A conventional electrical connection method for connecting battery cells 10 is shown in FIGS. 1 and 2, wherein the battery cells 10 each have a positive electrode terminal 11 and a negative electrode terminal 12 which are made of nickel, and then the battery cells 10 are connected in series by nickel plates 20 connected between terminals 11, 12 of different polarity of the battery cells 10, and the battery cells 10 can be connected in parallel by connecting the nickel plates 20 between the terminals of the same polarity.

The nickel plates 20 are spot welded to the positive or negative electrode terminals 11, 12, which requires high temperature to melt the nickel plates 20 and the electrode terminals 11, 12 of the battery pack, meanwhile, the nickel plates 20 are pressed onto the electrode terminals 11, 12, and the nickel plates 20 and the electrode terminals 11, 12 must be welded for several times to form several weld spots 21, so that the nickel plates 20 and the electrode terminals 11, 12 are fixed together by the weld spots 21. Namely, the nickel plates 20 and the electrode terminals 11, 12 are connected by the weld spots 21, however, the connecting area of the weld spots 21 is too small, which results in a high resistance, and accordingly affects the discharge and conductivity performance of the battery pack.

Furthermore, spot weld requires professional skill since the welding temperature and pressing force for pressing the nickel plates 20 and the electrode terminals 11, 12 need to be precisely controlled in order to obtain a reliable and low resistance welding connection.

The present invention has arisen to mitigate and/or obviate the afore-described disadvantages.

SUMMARY OF THE INVENTION

The primary object of the present invention is to provide a method for forming low-resistance electric connection points for a battery cell with two external nickel electrode terminals, which is capable of solving the problem that, when electrical connection points are formed on the external nickel electrode terminals of a conventional battery, the discharge and conductivity performance of the battery will be deteriorated.

To achieve the above object, a method for forming low-resistance electric connection points for a battery cell with two external nickel electrode terminals, in accordance with the present invention, comprises the following steps:

Step A: preparing a battery cell and a graphite alloy made connecting member, wherein the battery cell has two external nickel electrode terminals, which are a positive electrode terminal formed at one end of the battery cell and a negative electrode terminal formed at another end of the battery cell. The connecting member is made of a graphite alloy selected from a group consisting of silver graphite, copper graphite or sliver-copper graphite alloy, and the content of graphite in the graphite alloy connecting member is less than 50%.

Step B: bringing the graphite alloy connecting member into contact with the external nickel electrode terminals of the battery cell.

Step C: performing a dissolving process between the graphite alloy connecting member and the external nickel electrode terminals of the battery cell: when the graphite alloy connecting member is brought into contact with the external nickel terminals of the battery cell, graphite will be separated out of the graphite alloy connecting member, and the nickel will be separated out of the external nickel terminals of the battery cell, and then the graphite and the nickel are dissolved into each other, so that the graphite alloy connecting member and the external nickel electrode terminals of the battery cell 30 are melted and connected together.

Step D: forming two electrical connection points at both ends of the battery cell: electrical connections are formed at both ends of the battery cell to establish electrical connection between the graphite alloy connecting member and the external nickel electrode terminals of the battery cell after they are melted and connected together.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 3:
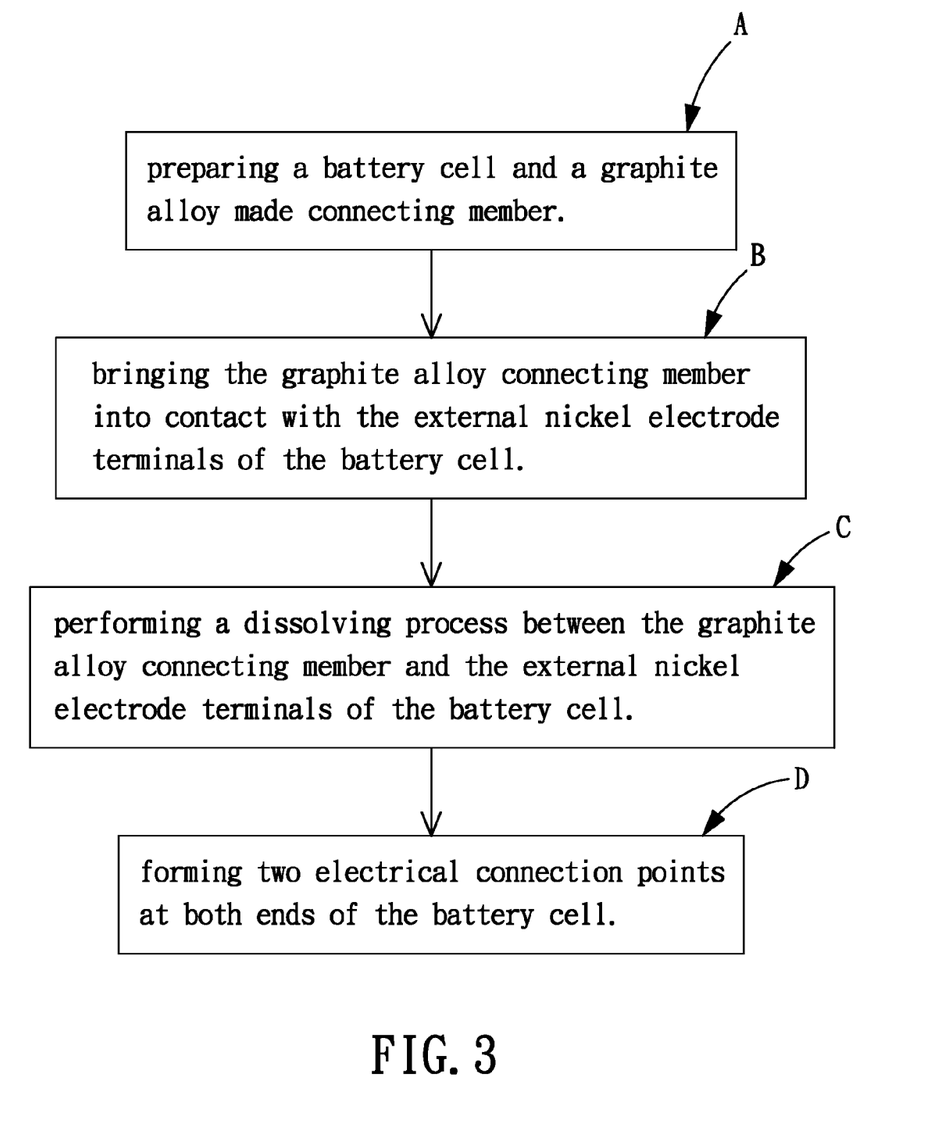
FIG. 3 is a flow chart of the present invention showing a method for forming low-resistance electric connection points for a battery cell with two external nickel electrode terminals.
Figure 4:
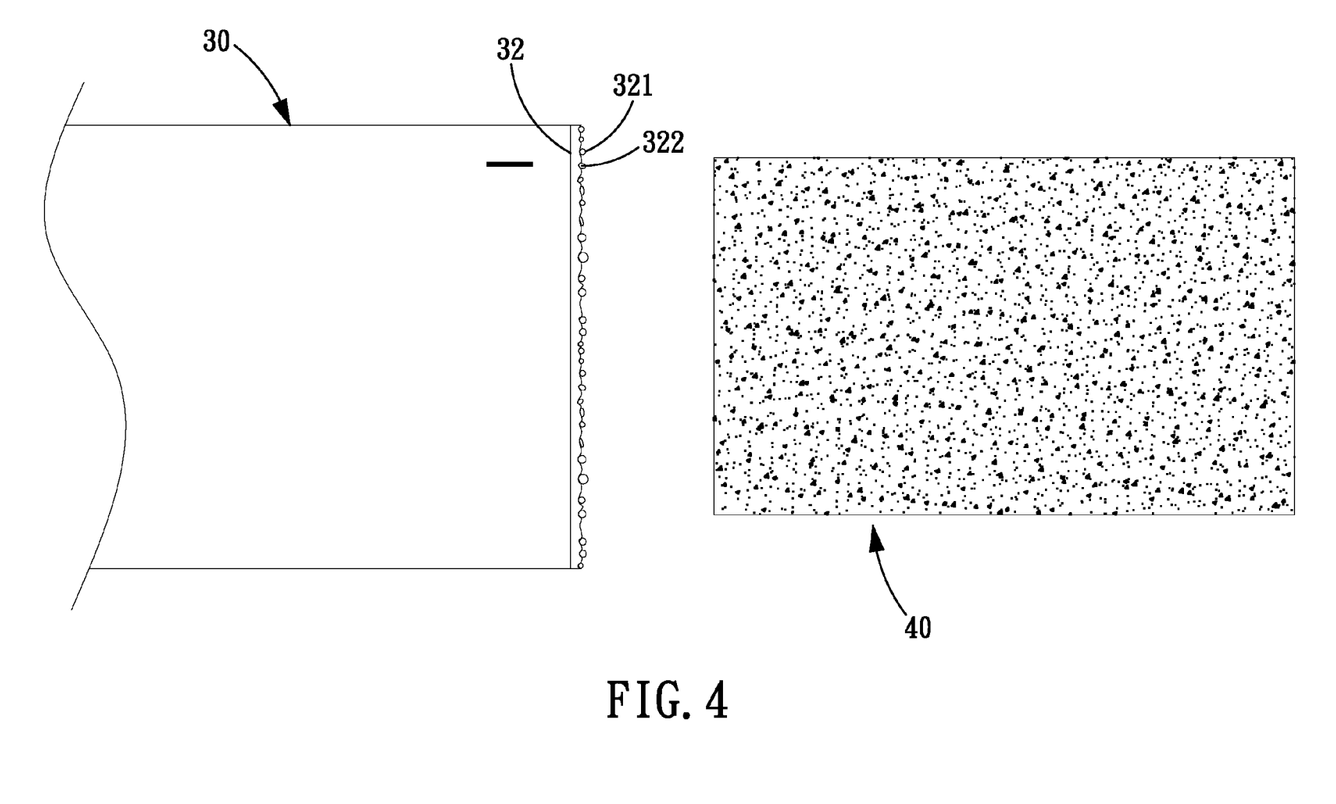
FIG. 4 is an illustrative view showing the graphite alloy connecting member and the battery cell with two external nickel electrode terminals in accordance with the present invention.

Referring to FIGS. 3-6, a method for forming low-resistance electric connection points for a battery cell with two external nickel electrode terminals in accordance with the present invention comprises the following steps:

Step A: preparing a battery cell 30 and a graphite alloy made connecting member 40, wherein the battery cell 30 has two external nickel electrode terminals, which are a positive electrode terminal 31 formed at one end of the battery cell 30 and a negative electrode terminal 32 formed at another end of the battery cell 30. The graphite alloy connecting member 40 is made of a graphite alloy selected from a group consisting of silver graphite, copper graphite or sliver-copper graphite alloy, and the content of graphite in the graphite alloy connecting member 40 is less than 50%.

Step B: bringing the graphite alloy connecting member 40 into contact with the external nickel electrode terminals of the battery cell 30.

Figure 5:
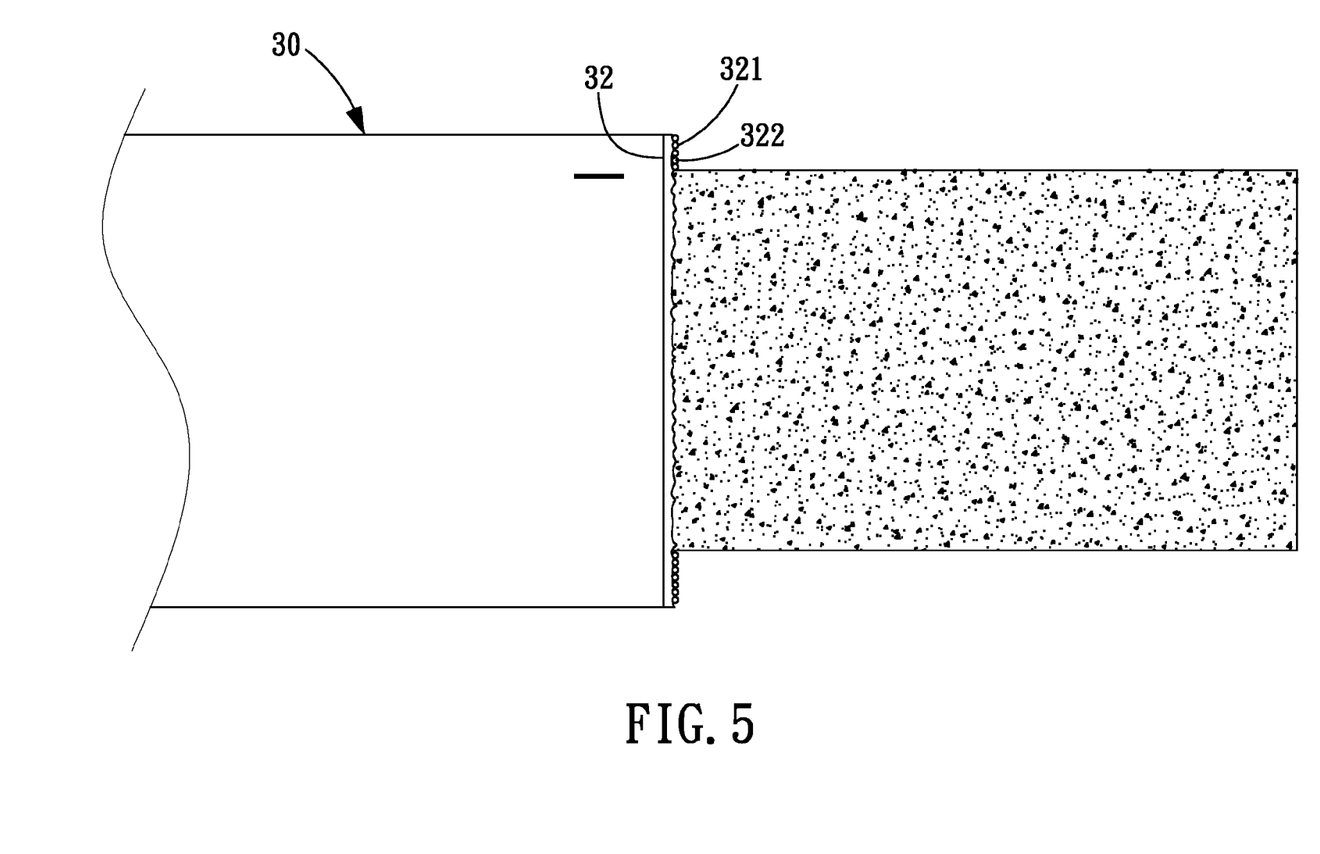
FIG. 5 shows that the graphite alloy connecting member is melted and connected to the battery cell with two external nickel electrode terminals in accordance with the present invention.

Step C: performing a dissolving process between the graphite alloy connecting member 40 and the external nickel electrode terminals of the battery cell 30: when the graphite alloy connecting member 40 is brought into contact with the external nickel terminals of the battery cell 30, graphite will be separated out of the graphite alloy connecting member 40, and the nickel will be separated out of the external nickel terminals of the battery cell 30, and then the graphite and the nickel are dissolved into each other, so that the graphite alloy connecting member 40 and the external nickel electrode terminals of the battery cell 30 are melted and connected together.

Step D: forming two electrical connection points at both ends of the battery cell: electrical connections are formed at both ends of the battery cell 30 to establish electrical connection between the graphite alloy connecting member 40 and the external nickel electrode terminals of the battery cell 30 after they are melted and connected together.

Since the external nickel terminals of the battery cell 30 contain nickel, they are likely to be oxidized to produce oxides 321 or impurities 322, which will have a direct influence on the conductivity, and deteriorate the discharge and conductivity performance of the battery cell. When the graphite alloy connecting member 40 is brought into contact with the external nickel terminals of the battery cell 30, graphite will be separated out of the graphite alloy connecting member 40, and the nickel will be separated out of the external nickel terminals of the battery cell 30, and then the graphite and the nickel are dissolved into each other, so that the graphite alloy connecting member 40 and the external nickel electrode terminals of the battery cell 30 are melted and seamlessly connected.

Figure 6:
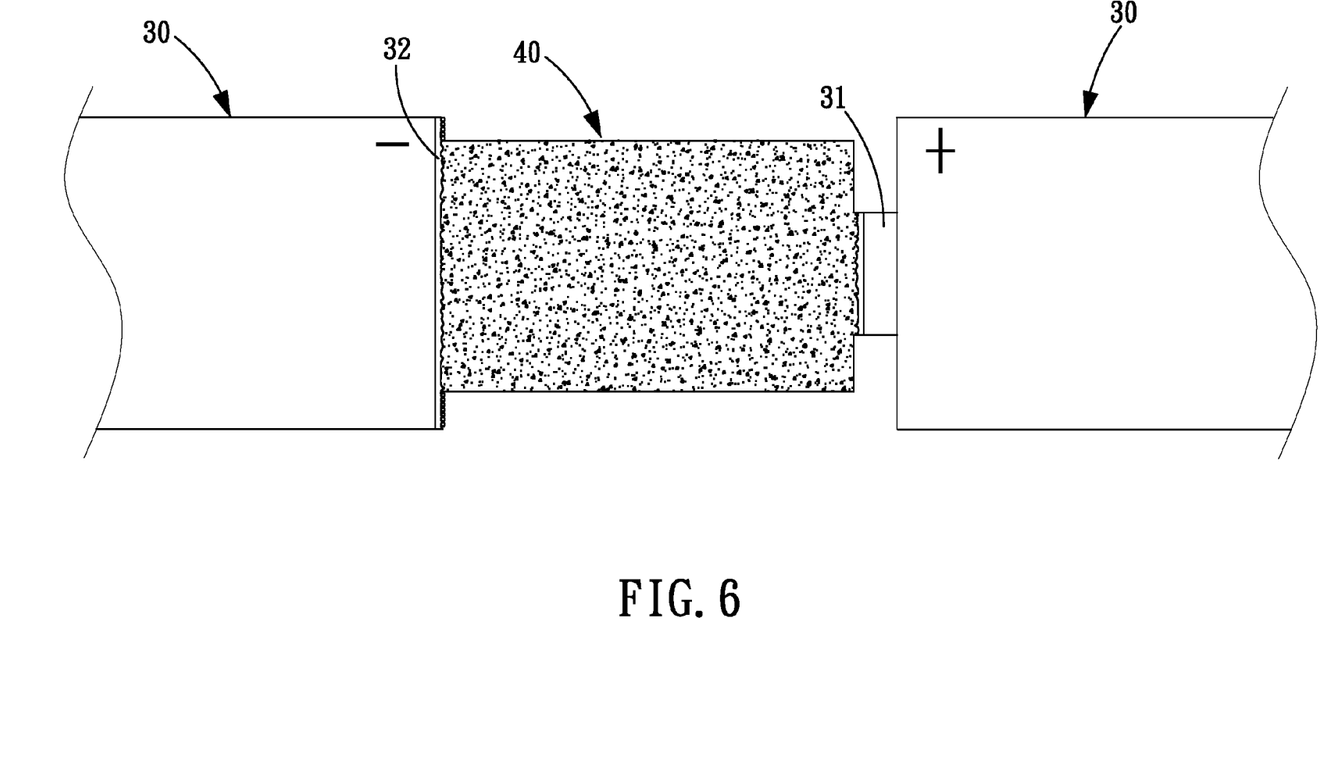
FIG. 6 is an illustrative view of the present invention showing that a graphite alloy connecting member is connected between a positive and a negative electrode terminals of two battery cells.

By the above method, the two electrical connection points at both ends of the battery cell 30 can be connected to external nickel electrode terminals of another battery cell, as shown in FIG. 6, so that a plurality of battery cells can be connected in series or in parallel.

Figure 7:
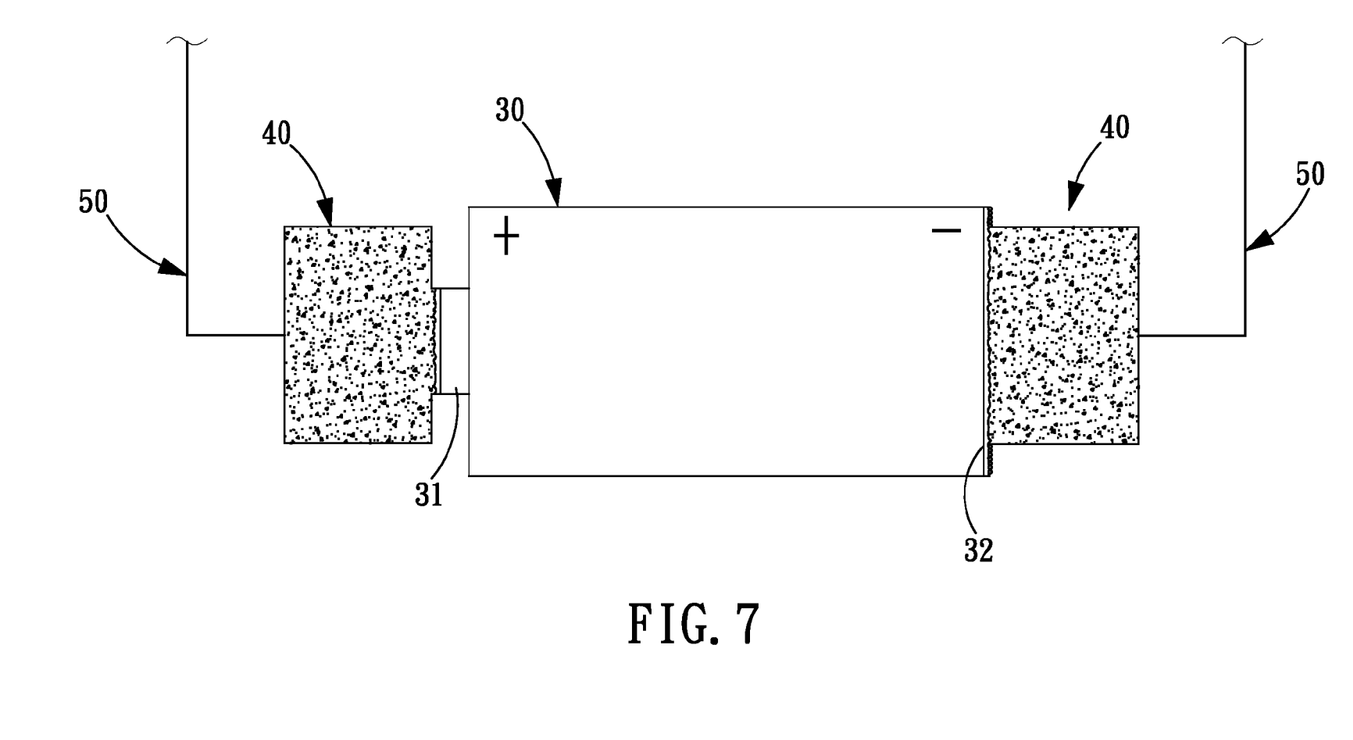
FIG. 7 is an illustrative view of the present invention showing that the two electrical connection points at both ends of the battery cell are connected to a conductive wire, respectively.
Figure 8:
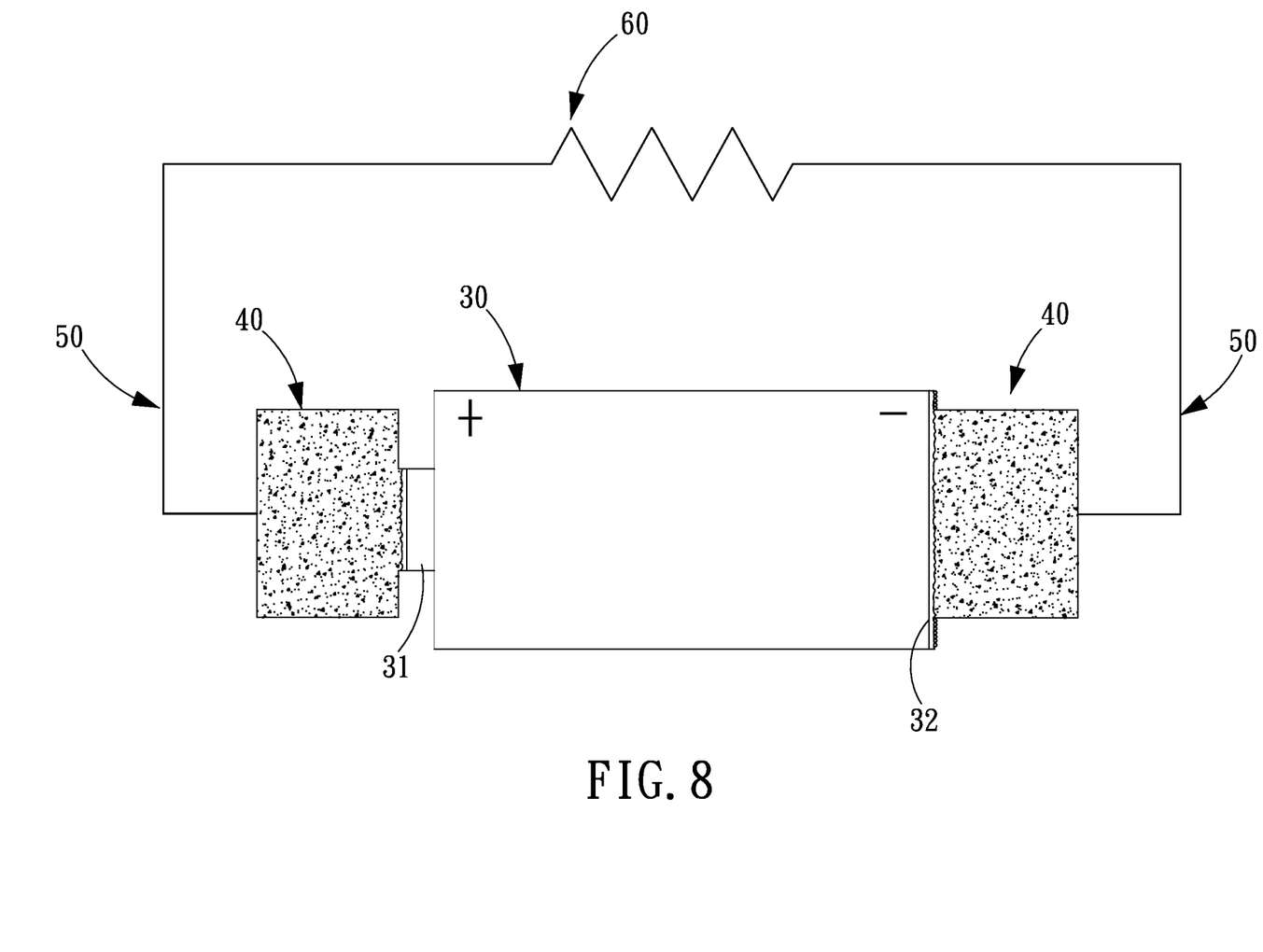
FIG. 8 is an illustrative view of the present invention showing that the two electrical connection points at both ends of the battery cell are connected to a load so as to form a complete loop.

Further as shown in FIGS. 7 and 8, the two electrical connection points at both ends of the battery cell 30 can be connected to a conductive wire 50, and then the conductive wire 50 can be connected to an electric equipment, namely, as shown in FIG. 8, the conductive wire 50 is connected to a load 60 so as to form a complete loop.

The graphite alloy connecting member 40 and the external nickel electrode terminals of the battery cell 30 are seamlessly connected in a seamless manner, so that the contact resistance of the battery cell is reduced to the least, while the discharge and conductivity performance of the battery cell are improved. Furthermore, the electrical connection points are easily formed just by bringing the graphite alloy connecting member 40 into contact with the external nickel electrode terminals of the battery cell 30. Hence, the graphite alloy connecting member 40 and the external nickel electrode terminals of the battery cell 30 can be easily connected.

While we have shown and described various embodiments in accordance with the present invention, it is clear to those skilled in the art that further embodiments may be made without departing from the scope of the present invention.

What is claimed is:

1. A method for forming low-resistance electric connection points for a battery cell with two external nickel electrode terminals, comprising the following steps:

preparing the battery cell and a graphite alloy connecting member, the two external nickel electrode terminals being formed at both ends of the battery cell, the graphite alloy connecting member being made of a graphite alloy selected from a group consisting of silver graphite, copper graphite and sliver-copper graphite alloy, and the content of graphite in the graphite alloy connecting member being less than 50%;

bringing the graphite alloy connecting member into contact with the external nickel electrode terminals of the battery cell;

performing a dissolving process between the graphite alloy connecting member and the external nickel electrode terminals of the battery cell, when the graphite alloy connecting member is brought into contact with the external nickel electrode terminals of the battery cell, graphite will be separated out of the graphite alloy connecting member, and nickel will be separated out of the external nickel terminals of the battery cell, and then the graphite and the nickel are dissolved into each other, so that the graphite alloy connecting member and the external nickel electrode terminals of the battery cell are melted and connected together; and forming two electrical connection points at both ends of the battery cell to establish electrical connection between the graphite alloy connecting member and the external nickel electrode terminals of the battery cell after the graphite alloy connecting member and the external nickel electrode terminals are melted and connected together.

2. The method for forming low-resistance electric connection points for a battery cell with two external nickel electrode terminals as claimed in claim 1, wherein the two electrical connection points at both ends of the battery cell are connected to a conductive wire, and then the conductive wire is connected to a load so as to form a complete loop.

3. The method for forming low-resistance electric connection points for a battery cell with two external nickel electrode terminals as claimed in claim 1, wherein the two electrical connection points at both ends of the battery cell are connected to external nickel electrode terminals of another battery cell.

* * * * *